3,370,052
PROCESS FOR THE PRODUCTION OF HIGH MOLECULAR WEIGHT AMORPHOUS COPOLYMERIZATES OF ETHYLENE AND A HIGHER ALPHA-OLEFIN IN INCREASED YIELDS
Rino Mostardini, Milan, Roberto Magri, Salsomaggiore, Parma, Rosario Lanzo, Mantua, and Mario Piazza, Ferrara, Italy, assignors to Montecatini Edison S.p.A., Milan, Italy, a corporation of Italy
No Drawing. Continuation of application Ser. No. 320,917, Nov. 1, 1963. This application July 13, 1966, Ser. No. 564,746
Claims priority, application Italy, Dec. 11, 1957, 17,706/57, Patent 581,418
17 Claims. (Cl. 260—88.2)

This application is a continuation of our application Serial No. 320,917, filed Nov. 1, 1963, and now abandoned, which was a continuation-in-part of our application Serial No. 779,249, filed December 9, 1958, and now abandoned.

This invention relates to a new catalytic process for producing amorphous, linear, high molecular weight vulcanizable copolymerizates of ethylene and propylene or butene-1 in high yields based on the amount of catalyst used.

Copolymerizates of ethylene and a higher alpha-olefin, more particularly, copolymerizates of ethylene and propylene, have been known for some time. Up to comparatively recent times, such copolymerizates were all partially crystalline and film-forming. That is, the copolymerizates were made up of macromolecules each of which exhibited crystallinity when examined under the X-rays.

Amorphous linear copolymerizates of ethylene and a higher alpha-olefin which are vulcanizable to elastomers are relatively new in the art. Such amorphous copolymerizates were first described in the literature by Natta et al. in La Chimica e l'Industria, vol. 39, pages 733–743, September, 1957; and vol. 39, pages 825–831, October, 1957.

The process by which said amorphous copolymerizates were produced involved effecting the copolymerization at a temperature between room temperature and 100° C. in an extraneous hydrocarbon solvent, containing a catalyst prepared from a hydrocarbon-soluble vanadium compound and an alkyl aluminum compound, while maintaining, in the gas phase, a propylene/ethylene molar ratio of at least 1:1, or a butene-1/ethylene molar ratio of at least 2:1.

By that process, there were obtained new and very valuable linear, amorphous propylene/ethylene copolymerizates.

However, the yield of such copolymerizates obtained, based on the amount of the catalyst used, was comparatively low.

It was determined that the comparatively low yield of the desired copolymerizates resulted from the fact that the amorphous copolymers of ethylene and propylene or butene-1 are soluble in the extraneous hydrocarbon solvents, such as heptane, which were used as the liquid copolymerization medium inert to the catalyst.

With dissolution of the copolymerizates in the hydrocarbon solvent, as the copolymerizates are formed, the reaction mass becomes progressively more viscous. The increase in viscosity is rapid, and at even moderate concentrations of the dissolved copolymerizate, that is at even moderate conversions of the comonomers, the viscosity reaches a value such that diffusion of the gaseous monomers through the mass and contact thereof with the catalyst is impeded and cannot be facilitated by stirring. Local overheating occurs, leading to heterogeneity in the reaction, the concentration of the monomers throughout the mass becomes increasingly non-uniform, and the copolymerizate formed, if any is formed in the viscous mass, becomes increasingly heterogeneous both in composition and molecular weight distribution.

After a relatively short reaction time, most of the gases pass through the viscous reaction mass unconverted and the yield of copolymerizate drops practically to zero.

The process utilizing solvents which dissolve the hydrocarbon amorphous copolymerizates as the latter are formed does not lend itself to the production of the amorphous copolymerizates on a continuous, large-volume commercial scale.

The primary object of this invention is to provide an improved process for the production of the linear, amorphous, vulcanizable copolymerizates of ethylene and propylene or butene-1 in high yields on the amount of catalyst used, and which has none of the disadvantages of the process in which the liquid copolymerization medium is also a solvent for the amorphous copolymerizates.

This and other objects are accomplished by the present invention, in accordance with which ethylene and propylene or butene-1 are copolymerized to the amorphous copolymerizates in a liquid reaction medium which is a non-solvent for the amorphous copolymerizates and from which the copolymerizates separate as produced, in the form of fine particles.

Unexpectedly, we have found that mixtures of liquid propylene and ethylene, and of liquid butene-1 and ethylene do not dissolve the amorphous, linear copolymerizates obtained by copolymerizing propylene and ethylene, or butene-1 and ethylene, under our conditions.

According to this invention, therefore, propylene and ethylene, or butene-1 and ethylene, are copolymerized to the amorphous, linear, vulcanizable copolymerizates in a liquid reaction medium consisting essentially of a liquid mixture of the comonomers containing the catalyst prepared from a hydrocarbon-soluble vanadium compound and an alkyl aluminum compound, of the kind exemplified in our parent application Serial No. 779,249, and the only extraneous inert hydrocarbon solvent present during the copolymerization is the minor amount which may be introduced with the catalyst components or with the preformed catalyst.

Using the liquid monomers as the liquid copolymerization medium, the copolymerization is carried out at reduced temperatures of from room temperature down to —100° C, preferably at temperatures between —10° C. and —80° C.

The present process using, as the liquid copolymerization medium, a non-solvent for the amorphous copolymerizates which is a liquid mixture of the monomers being copolymerized, has very substantial advantages.

The copolymerizates, as produced, separate in the form of fine particles from the non-solvent liquid phase consisting essentially of the liquid monomers and are not dissolved therein to increase the viscosity and interfere with further progress of the copolymerization reaction. The mass remains in readily stirrable condition, the gaseous phase diffuses rapidly and uniformly through the non-viscous liquid reaction mass, resulting in uniform contact of the monomers with the catalyst, the reaction heat is dissipated evenly, and the temperature remains uniform throughout the mass.

By using the copolymerization medium consisting essentially of the liquid monomers and which does not dissolve the amorphous copolymerizates, we obtain markedly increased yields of the copolymerizates based on the amount used of catalyst prepared from the hydrocarbon-soluble vanadium compound and the alkyl aluminum compound. Using such catalysts in concentrations from 0.02 g./liter up to 0.2 g./liter, and reactants of commercial grade, we can readily obtain yields of several hundred grams of the amorphous copolymerizates per gram of catalyst.

In order to produce the linear, amorphous, vulcanizable propylene/ethylene and butane-1/ethylene copolymerizates, it is necessary to maintain, in the reacting liquid phase, a molar ratio of propylene to ethylene such that the propylene is from 80 to 99.5 mol percent, and the ethylene is, conversely from 0.5 to 20 mol percent, of the total liquid monomers, and the molar ratio of butene-1 to ethylene is at least 95 mol percent and the ethylene is conversely at most 5 mol percent of the total liquid monomers.

In carrying out the improved process of this invention, the monomer mixture to be copolymerized is prepared by mixing the monomers together in the appropriate molar proportions at the selected temperature in the range at which the copolymerization is to be carried out, e.g., in the range −10° C. to −100° C.

Thus, gaseous propylene or butene-1 is introduced into the copolymerization reactor and liquified, and the liquid propylene or butene-1 is saturated with gaseous ethylene which dissolves in the liquid propylene or butene-1. After the liquid mass comprising the liquid comonomers is prepared, the hydrocarbon-soluble vanadium compound and the alkyl aluminum compound, from which the catalyst is formed, are introduced separately, as solutions in a hydrocarbon solvent inert to the catalyst, such as n-heptane for example, the amount of such solvent present in the reacting mass being insufficient to dissolve any appreciable amount of the amorphous copolymerizate which is formed. Or the catalyst can be preformed by mixing the components in the absence of the monomers in a small amount of hydrocarbon solvent.

The copolymerization starts vigorously with immediate formation of the copolymerizate.

In order to maintain the required relative proportions of the comonomers in the liquid phase, gaseous ethylene is fed into the reactor continually, at a rate such that the molar ratio of the comonomers in the reacting liquid phase is maintained constant.

At the end of the copolymerization reaction, the monomers which are still liquid and which can be recycled are removed from the reaction mass by evaporation and, if necessary, the copolymerizates can be purified. The purification is considerably facilitated by the essential absence of extraneous hydrocarbon solvents such as heptane, since it is possible to use alcohols which can be readily recovered, in the purification step. The purification is also materially aided by the low concentration of inorganic products associated with the copolymerizates, and which results from the fact that, since the copolymerization reaction is not impeded by dissolution of the copolymerizate in the liquid copolymerization medium and increased viscosity of the medium. High yields of the amorphous copolymerizate per gram of introduced catalyst are obtained and the concentration of residual catalyst in the copolymerizate is very low.

The purification is particularly facilitated when, as shown in Examples 7 and 8 below, the catalyst contains very small amounts of the vanadium compound, that is, when a high ratio of the alkyl aluminum compound to hydrocarbon-soluble vanadium compound is used for the catalyst preparation.

At the highest yields of copolymerizate based on the amount of catalyst used, the amount of catalyst which is associated with the amorphous copolymerizate is so small that purification of the latter can be omitted.

Although copolymerization temperatures of −10° C. to −80° C. are preferred, it is also possible to obtain the amorphous, linear, vulcanizable propylene/ethylene and butene-1/ethylene copolymerizates using the present process at temperatures up to +30° C., without any appreciable decrease in the yield of copolymerizate obtained based on the catalyst concentration used. Obviously, when the higher temperatures up to room temperature are used, the pressure must be increased correspondingly.

Using a temperature between −40° C. and −45° C., instead of −50° C. to −60° C., in the copolymerization of propylene and ethylene, the reaction is carried out under a pressure of 2.0 to 2.5 atm. instead of under atmospheric pressure. At a copolymerization temperature of −17° C. to −20° C., a pressure of about 5.0 atm. is used, while at a temperature of +5° C., a pressure of 6.0 to 7.0 atm. is used. The use of increased pressure has the advantage that simpler cooling equipment can be employed.

As is well known, decrease in the temperature at which reactions of the present type are carried out, normally has the effect of decreasing the reaction rate and the amount of the reaction product produced in a given time with a given amount of catalyst.

It is highly unexpected, therefore, that using, as the liquid copolymerization medium, the liquid comonomers which are non-solvents for the amorphous copolymerizates, and temperatures down to −100° C., we obtained a marked increase in the overall reaction rate and in the yield of the amorphous copolymerizate produced based on the amount of catalyst used, as compared to the amount of amorphous copolymerizate obtained from a given amount of the same catalyst using a liquid copolymerization medium consisting of an extraneous hydrocarbon solvent and temperatures in the range from 30° C. to 100° C.

In fact, a marked increase in the overall reaction rate and in the yield of copolymerizate are obtained by the present process, as compared to the process in which the copolymerization is carried out in a liquid reaction medium consisting of an extraneous hydrocarbon solvent such as heptane, even when both copolymerizations are carried out at the reduced temperatures.

For instance, by copolymerizing propylene and ethylene at −10° C. in n-heptane (as the liquid reaction medium) containing a catalyst formed from vanadium tetrachloride and diethyl aluminum monochloride in relative amounts of 0.25 millimoles of the tetrachloride to 1.25 millimoles of the dialkyl aluminum chloride, and while maintaining a propylene/ethylene molar ratio of 2:1 in the gas phase, there are obtained, after 30 minutes, 15 grams of amorphous propylene/ethylene copolymerizate, or a yield of 75 grams per gram of catalyst used.

After 30 minutes, the reaction medium was so viscous that further copolymerization was inhibited and the run was terminated.

Using the same catalyst, in like concentration, but effecting the propylene/ethylene copolymerization at −10° C. by the present process utilizing the liquid reaction medium consisting essentially of the liquid propylene/ethylene mixture, a large yield of the amorphous copolymerizate was obtained in 30 minutes, and since the reaction mass was not viscous, and further copolymerization was not inhibited, the reaction was allowed to continue for one hour at −10° C., for a total yield of the amorphous copolymerizate of 1000 grams, or 600 grams/gram of the catalyst used.

The amorphous copolymerizates contain, by weight in the copolymer macromolecule, from 5% to 70% of ethylene, and, conversely, from 95% to 30% of propylene or butene-1. The minimum propylene or butene-1 content in the copolymer macromolecule is about 30% by weight.

In order to be vulcanizable to commercially acceptable and useful elastomers, the amorphous copolymerizates must be solids having an average molecular weight above 20,000, preferably above 50,000 and be soluble in boiling n-heptane while being substantially insoluble in boiling acetone. The molecular weights correspond to intrinsic viscosities of 0.5 to 10.0, determined in tetrahydronaphthalene at 135° C. However, copolymerizates having intrinsic viscosity between 0.5 and up to about 5.0, are preferred for the production of the most practically useful elastomers.

The present process tends to produce amorphous copolymerizates of high molecular weight. It may be desirable, therefore, to effect the copolymerization in the presence of agents which have a regulating effect on the molecular weight, such as small amounts of gaseous hydrogen or of a zinc alkyl, in order to obtain copolymerizates having the preferred intrinsic viscosity between 0.5 and 5.0.

The copolymerizates obtained by this process are substantially homogeneous with respect to molecular weight distribution, and the average molecular weight is such that the copolymerizates are substantially soluble in boiling n-heptane and substantially free of fractions which are soluble in boiling acetone, and of fractions which are insoluble in boiling n-heptane. In general, the crude amorphous copolymerizates obtained by this process can be vulcanized directly to very useful elastomers, using known vulcanizing recipes and methods, without intermediate fractionation for the removal of fractions soluble in boiling acetone and/or residues insoluble in boiling n-heptane which, if present in any appreciable amounts would have an adverse effect on the resistance to permanent deformation under stress of the elastomers resulting from the vulcanization.

Table I below shows the results obtained by subjecting the copolymerizates of Examples 1–12 to successive fractional extraction with boiling acetone, ether, and n-heptane.

chloride, vanadium triacetylacetonate, vanadyl diactylacetonate, vanadyl monochlorodiacetylacetonate, triethyl-, tri-isopropyl-, triisobutyl-, or trihexyl orthovanadates; monochloro-diethyl-, diisopropyl-, diisobutyl-, or di-hexylorthovanadates; monobromo-diethyl-, diisopropyl-, diisobutyl-, or dihexyl- orthovanadates; dichloro-monoethyl-, monoisopropyl-, monoisobutyl-, or monohexyl-orthovanadates; dibromo- monoethyl-, monoisopropyl-, monoisobutyl-, or monohexyl-orthovanadates; and the corresponding fluoro-derivatives.

Specific alkyl aluminum compounds which can be used as the other catalyst-forming component include triethyl aluminum, trihexyl aluminum, triisobutyl aluminum, diethyl aluminum chloride, diethyl aluminum fluoride, diisobutyl aluminum chloride, dihexyl aluminum chloride, ethyl aluminum dichloride, isobutyl aluminum dichloride, hexylaluminum dichloride, etc.

The catalyst-forming components are selected so that at least one of them contains halogen.

The molar ratio between the alkyl aluminum compound and hydrocarbon-soluble vanadium compound in the catalyst may vary within wide limits, and may be between 15:1 and 1:1. The preferred molar ratio is 5:1 to 2:1.

Mixtures of the hydrocarbon-soluble vanadium compounds with hydrocarbon-soluble compounds of other transition metals may be used in preparing the catalyst, more particularly mixtures of $VCl_4$ or $VOCl_3$ with $TiCl_4$ in which the V to Ti molar ratio is at least 0.5.

The following examples are given to illustrate the invention.

*Example 1*

1000 cc. propylene are condensed in a 1500 cc. cylin

TABLE I

| Copolymer | [η] | Solvent extraction | | | |
| --- | --- | --- | --- | --- | --- |
| | | Acetone extract, percent, | Ether extract, percent, | Heptane extract, percent | Residue, percent |
| Copolymerizate of Ex. 1 | 4.93 | 1.2 | 12 | 86.8 | 0 |
| Copolymerizate of Ex. 2 | 7.28 | 0.8 | 15 | 84 | 0.2 |
| Copolymerizate of Ex. 3 | | 1.7 | 19.2 | 77.8 | 0 |
| Copolymerizate of Ex. 4 | 7.05 | 3.6 | 6.2 | 90.2 | 0 |
| Copolymerizate of Ex. 5 | 7.28 | 2.5 | 10.8 | 86.7 | 0 |
| Copolymerizate of Ex. 6 | 7.18 | 5 | 5.8 | 89.2 | 0 |
| Copolymerizate of Ex. 7 | 7.72 | 1.7 | 18.3 | 79.2 | 0.8 |
| Copolymerizate of Ex. 8 | 8.40 | 1.4 | 6.9 | 91.1 | 0.6 |
| Copolymerizate of Ex. 9 | 7.24 | 2.5 | 11 | 86.5 | 0 |
| Copolymerizate of Ex. 10 | 9.63 | 3.2 | 6 | 89.9 | 0.9 |
| Copolyermizate of Ex. 11 | 7.26 | 5 | 7.5 | 86.7 | 0.83 |
| Copolymerizate of Ex. 12 | 7.48 | 5 | 12 | 80.5 | 2.5 |

As is evident from Table I, the amorphous copolymerizates obtained by the present process have a high degree of polymerization, and are substantially homogenous as shown by the substantial absence of acetone-soluble fractions and of heptane-insoluble residues.

As stated, and as exemplified in our parent application Ser. No. 779,249, the catalyst which can be used for producing the vulcanizable amorphous propylene/ethylene and butene-1/ethylene copolymerizates by the present process, are prepared from hydrocarbon-soluble vanadium compounds and alkyl aluminum compounds.

Any of the hydrocarbon-soluble vanadium compounds can be used as one catalyst-forming component, including vanadium tetrahalides, vanadium oxyhalides, vanadium acetyl-acetonates, vanadyl halo-acetylacetonates having the formula $VOAc_2X$ or $VOAcX_2$ in which Ac represents the acetylacetonic residue and X is any halogen (Cl, Br, I or F), vanadyl alkoxides having the formula $VO(OR)_3$, and vanadyl halo-alkoxides having the formula $VO(OR_2)X$ or $VO(OR)X_2$ in which R is an alkyl radical containing from 1 to 8 carbon atoms, and X is any halogen.

Specific, typical hydrocarbon-soluble vanadium compounds that can be used as one catalyst-forming component include vanadium oxy-trichloride, vanadium tetradrical glass reactor, the bottom of which consists of a porous diaphragm, provided with a stirrer and cooled to −65° C. in a cooling bath.

Gaseous propylene is fed through the porous diaphragm and the feed rate is regulated so that propylene is completely liquified and only a small portion is not condensed which can be determined by a bubble-counter placed at the outlet of the apparatus.

The liquid propylene is then saturated with gaseous ethylene introduced through the porous diaphragm at a flow-rate of 100 to 130 liters per hour; temperature inside the reactor is kept at −58° C. When saturation is complete, 4 cc. of a 12% solution of triisobutyl-aluminum in heptane (by volume) and then 4 cc. of an 0.66% (by volume) solution of $VCl_4$ in heptane are added. The reaction starts vigorously and formation of polymer is immediately noted. The operation is continued for 2 hours while ethylene is continuously fed so that saturation is maintained.

Now and then, in order to make the reaction mixture more fluid, further propylene is fed which is liquified, thus increasing the liquid volume. After two hours the content of the reactor is discharged, degassed and dried under vacuum.

99.6 g. of crude amorphous copolymerizate are obtained, with a yield of 250 g. per gram of catalyst. The intrinsic viscosity of the amorphous copolymerizate, measured in tetrahydronaphthalene at 135° C., is 4.93, corresponding approximately to a molecular weight of 370,000.

As shown in Table I, the copolymerizate is substantially soluble in boiling n-heptane, comprises only small amounts of fractions soluble in boiling acetone, and is free of fractions insoluble in boiling n-heptane. The elastomer obtained by vulcanizing this crude amorphous copolymerizate by the method described hereinbelow had the mechanical characteristics reported in Table II.

Example 2

In apparatus as in Example 1, 500 cc. propylene are condensed by cooling to −75° C. and ethylene is introduced at a flow rate of 80 to 100 liters per hour.

5 cc. of a 10% solution of triisobutyl aluminum in heptane and 5 cc. of a 1.4% $VCl_4$ solution in heptane are then introduced.

The reaction starts rapidly and is continued for 2 hours; the product is then discharged and treated as described in Example 1.

116.5 g. of a crude amorphous copolymerizate practically free of fractions insoluble in boiling n-heptane, with a yield of 233 g. polymer per gram of catalyst.

The intrinsic viscosity and the results obtained by subjecting the crude copolymerizate to successive extraction with the boiling solvents are reported in Table I; for the characteristics of the elastomer obtained by vulcanizing the copolymerizate see Table II.

Example 3

Into a 3000 cc. stainless steel autoclave provided with an agitator and cooled to −45° C. in a cooling bath, about 2000 cc. liquid propylene are introduced and then saturated with ethylene while keeping the pressure at about 2 atm. in the autoclave.

8 cc. of a 10% solution of triisobutyl aluminum in heptane and 8 cc. of a 1.4% solution of $VCl_4$ in heptane are then introduced. The reaction starts quickly as can be noted from the temperature increase inside the reactor and from the pressure increase. By further cooling, temperature is kept within 5° C. of −45° C.; the reaction is continued for 1 hour and, thereafter, pressure is discharged, the product is withdrawn from the autoclave, degassed and vacuum dried. 145 g. of crude, amorphous copolymerizate substantially soluble in boiling n-heptane are obtained, with a yield of 180 g. per gram of catalyst.

As shown in Table I, this copolymerizate is free of fractions insoluble in boiling n-heptane and practically free of fractions soluble in boiling acetone. Vulcanization of this copolymerizate as described hereinbelow, yielded an elastomer having the characteristics reported in Table II.

Example 4

In apparatus as in Example 1, 500 cc. propylene are condensed by cooling to −60° C. and ethylene is then introduced at a flow rate of 80–100 liters per hour. 5 cc. of a 7.6% solution of triethyl aluminum in heptane and 5 cc. of a 1.92% solution of $VCl_4$ in heptane are then introduced. The reaction starts quickly and is continued for 2 hours; the product is then discharged and treated as described in Example 1. 61 g. crude amorphous copolymerizate free of fractions insoluble in boiling n-heptane are obtained, with a yield of 122 g. per gram of catalyst.

The results of the fractionation of the copolymerizate with the boiling solvents are reported in Table I; see Table II for the characteristics of the vulcanized copolymerizate.

Example 5

Into an autoclave as in Example 3, cooled to −30° C., about 2000 cc. liquid propylene are introduced and then saturated with ethylene at a pressure of about 4 atms.

10 cc. of a 10% solution of triisobutyl aluminum in heptane and 10 cc. of a 1.4% solution of $VCl_4$ is heptane are then introduced. The reaction is continued for 1.5 hours, the product is then discharged and treated as described in Example 3.

265 g. of crude amorphous copolymerizate are obtained, with a yield of 265 g. per gram of catalyst.

The crude copolymerizate was extracted successively with acetone, ether and n-heptane, with the results shown in Table I which shows that the copolymerizate is substantially soluble in boiling n-heptane and substantially insoluble in boiling acetone. On vulcanization, an elastomer having the characteristics reported in Table II was obtained.

Example 6

In apparatus as in Example 1, 300 cc. butene-1 are condensed by cooling to −60° C. and then saturated with ethylene, 5 cc. of a 10% solution of triisobutyl aluminum in heptane and 5 cc. of a 1.4% solution of $VCl_4$ in heptane are introduced. The reaction starts quickly and is continued for 1 hour and 20 minutes; 36 g. of an amorphous copolymerizate practically free of fractions insoluble in boiling n-heptane are obtained.

The results of extracting this copolymerizate successively with the boiling solvents are reported in Table I; see Table II for the properties of the vulcanized copolymerizate.

Example 7

In apparatus as in Example 1, 1000 cc. propylene are condensed by cooling to −58° C. and saturated with ethylene as usual.

5.25 cc. of an 8.52% solution of triisobutyl aluminum in heptane and about 5.25 cc. of an 0.648% solution of $VCl_4$ in heptane are then introduced; the concentrations of the two solutions are calculated so that the ratio of triisobutyl aluminum to $VCl_4$ by mols amounts to 10:1.

The reaction starts immediately and is continued for 1.5 hours. The reactor is discharged, and the product is treated as in previous examples. 56 g. of crude amorphous copolymerizate are obtained, with a yield of 153 g. per gram of catalyst.

As shown in Table I, the copolymerizate is substantially soluble in boiling n-heptane, substantially insoluble in boiling acetone and practically free from fractions insoluble in boiling n-heptane. The characteristics of the vulcanized copolymerizate are reported in Table II.

Example 8

In apparatus as in Example 1, 1000 cc. of propylene are condensed by cooling to −58° C. and saturated with ethylene as usual.

6 cc. of a 12.2% solution of triisobutyl aluminum in heptane and 6 cc. of a 1.075% solution of $VCl_4$ in heptane are introduced, with a triisobutyl aluminum/$VCl_4$ mole ratio of 5.

The reaction is contained for 1.5 hours, the reactor is then discharged and the product is treated as in examples above.

118 g. of crude amorphous copolymerizate are obtained with a yield of 160 g. per gram of catalyst.

As shown in Table I, this copolymerizate is substantially soluble in boiling n-heptane, being free of fractions non-extractable with boiling n-heptane and comprising only minor amounts of fractions soluble in boiling acetone. The characteristics of the vulcanized copolymerizate are reported in Table II.

Example 9

Into an autoclave as in Example 3, cooled to −18° C., about 2000 cc. liquid propylene are introduced and saturated with ethylene under a pressure of 4 to 4.5 atms.

10 cc. of a 10% solution of triisobutyl aluminum in heptane and 10 cc. of a 1.4% solution of $VCl_4$ in heptane are then introduced. The reaction is continued for 1 hour and 15 minutes; thereafter the product is discharged and treated as described in Example 3.

170 g. of crude amorphous copolymerizate are obtained, with a yield of 170 g. per gram of catalyst.

As reported in Table I, the crude copolymerizate is practically free of fractions non-extractable with boiling n-heptane and comprises only 3.2% of a fraction soluble in boiling acetone. It is substantially soluble in boiling n-heptane; the elastomer obtained by vulcanizing the copolymerizate has properties as reported in Table II.

Example 10

Into an autoclave as in Example 3, cooled to +2° C., about 2000 cc. liquid propylene are introduced and then saturated with ethylene under a pressure of about 6 atms. 10.3 cc. of a 10% solution of triisobutyl aluminum in heptane and 10.3 cc. of a 1.4% solution of $VCl_4$ in heptane are then introduced. The reaction is continued for 1 hour and 20 minutes, the product is then discharged and treated as described in Example 3.

155 g. of crude amorphous copolymerizate which is substantially soluble in boiling n-heptane as shown in Table I are obtained, with a yield of 150 g. per gram of catalyst. The characteristics of the vulcanized copolymerizate are shown in Table II.

Example 11

Into an autoclave as in Example 3, kept at about 20° C. about 2000 cc. liquid propylene are introduced and then saturated with ethylene under 12 atm.

10.5 cc. of a 10% solution of triisobutyl aluminum in heptane and 10.5 cc. of a 1.4% solution of $VCl_4$ in heptane are introduced.

The reaction is continued for 1 hour and 25 minutes; thereafter the product is discharged and treated as described in Example 3.

140 g. of an essentially crude amorphous copolymerizate are obtained, with a yield of 133 g. per gram of catalyst.

The results of subjecting the crude copolymerizate to successive extraction with the boiling solvents are shown in Table I. On vulcanization, the copolymerizate yielded an elastomer having the characteristics given in Table II.

Example 12

150 g. propylene are condensed into the 1000 cc. glass reactor of Example 1, kept at the temperature of −60° C. 1000 cc. propylene are condensed in the reactor and the liquid is then saturated with ethylene.

Once saturation is reached, and while continuing bubbling ethylene into the liquid, there are added from separate containers a solution of triisobutyl aluminum and a solution of vanadium tetrachloride and titanium tetrachloride, both solutions in heptane.

The reaction starts immediately with formation of copolymer and is continued for 90 minutes. The crude copolymerizate and the excess propylene monomer are discharged, the excess propylene is evaporated and, after drying under vacuum, the copolymerizate is separated.

Example 14

Runs on the copolymerization of propylene and ethylene were carried out at the same temperature (−10° C.), but using different catalysts as disclosed herein, in different concentrations. The results are tabulated below.

Runs 1–4 were carried out in a 6 liter autoclave. After cooling the autoclave to −10° C., 5 liters of liquid propylene were added, followed by the introduction of ethylene up to an absolute pressure of 4.7 atms., corresponding to a molar equilibrium composition in the liquid phase of 98% propylene and 2% ethylene. The pressure was maintained constant at 4.7 atms. by a continuous ethylene feed, and the catalyst was charged in the form of a 10% heptane solution of the alkyl aluminum compound and a 2% heptane solution of the vanadium compound, to obtain the catalyst concentrations shown in the table, which are expressed in grams/liter.

The copolymerization reaction, which started immediately upon the addition of the catalyst, was continued for one hour at −10° C., after which the pressure was vented, the excess unreacted monomers were flashed off, and the copolymerizate was in a condition for vulcanization without further purification.

Runs 5–6 were carried out at −15° C., and the composition in the liquid phase corresponded to a propylene to ethylene molar ratio of 97 to 3. The catalyst was prepared from diethyl aluminum monochloride and vanadyl tri-isobutoxide.

Run 7 was also carried out at −10° C., but the copolymerization was conducted in a 20 liter autoclave, using 12 liters of liquid propylene and 4.7 atms. of ethylene. The copolymerization time was 90 minutes.

RUNS OF EXAMPLE 14

| Run No. | Al(isoBu)$_3$ | AlEt$_2$Cl | VCl$_4$ | VOCl$_3$ | VAc$_3$[1] | Copolymer G. | G./g. cat. | [η] | Percent propylene mol |
|---|---|---|---|---|---|---|---|---|---|
| 1 | 0.265 | | | 0.03 | | 70 | 47.5 | 2.1 | 44.0 |
| 2 | | 0.10 | 0.04 | | | 280 | 400 | 4.5 | 52.0 |
| 3 | | 0.16 | | 0.03 | | 280 | 295 | 4.0 | 51 |
| 4 | | 0.16 | | | 0.06 | 300 | 270 | 4.2 | 50.5 |
| 5 | | 0.59 | | | [2]0.22 | 450 | 110 | 8.0 | 31.7 |
| 6 | | 0.427 | | | [2]0.202 | 290 | 93 | 5.0 | 35.0 |
| 7 | | 0.10 | 0.04 | | | 1,000 | 600 | 5.0 | 45.0 |

[1] Vanadium triacetylacetonate.
[2] Vanadyl tri-isobutoxide.

$C^{14}$ labeled ethylene is then bubbled through at the rate of 120 l/h. Two solutions, one of 1.73 millimols trihexyl aluminum and the other of 0.58 millimols vanadium tetrachloride, each in 10 cc. n-heptane, are prepared.

Operating at −60° C., one-half cc. of each solution is added, at 1 minute intervals, to the liquid monomer mixture.

After 20 minutes, the reaction is stopped and 14 g. of an amorphous ethylene-propylene copolymerizate, which is found, by radiochemical analysis, to contain 51% by weight (61% molar) of ethylene, are recovered.

Example 13

The glass reactor of Example 1 is used; it is kept in a cooling bath at −58° C.

The crude copolymerizates obtained as described in the foregoing examples can be vulcanized directly, without subjecting them to any fractional extraction, to elastomers which have excellent mechanical, and in particularly elastic, characteristics.

Copolymerizates obtained by examples given herein were vulcanized by the following method: 100 parts of the amorphous copolymerizate were mixed with 30 parts SRF carbon black, 2 parts sulfur, 4 parts tert. butyl perbenzoate and 4 parts dioctyl-phthalate, and the mix was cured in a press at 150° C. for 20 minutes.

Specimens of the resulting elastomers were examined for tension set, with the results given in Table II below, which shows the percentages of tension set $R_1$ and $R_2$, as determined by the following two tests, respectively.

For comparison there are reported the values $R_1$ and $R_2$ for an elastomer obtained by the same vulcanizing method from an amorphous, linear propylene/ethylene copolymerizate obtained by effecting the copolymerization in a liquid reaction medium consisting of a solvent for the copolymerizate (n-heptane) at a temperature in the range between room temperature and $+100°$ C.

The value $R_1$ was determined by applying to the specimen a stress sufficient to effect an elongation thereof of 200%, for 10 minutes, leaving the specimen free for a further 10 minutes, and then determining the residual elongation in respect to the initial length of the specimen.

The value $R_2$ was determined by keeping the specimen under a 200% elongation for one hour, and then determining the residual elongation after releasing the specimen for one minute. The conditions for determining the value $R_2$ are more severe than those used to determine the value $R_1$.

TABLE II

| Copolymerizate | Tension Set | |
|---|---|---|
| | $R_1$ | $R_2$ |
| Ethylene-propylene obtained by process utilizing liquid reaction medium consisting of n-heptane | 6-8 | 8-10 |
| Ethylene-propylene of Example 1 | 2 | 4 |
| Ethylene-propylene of Example 2 | 4 | 6 |
| Ethylene-propylene of Example 3 | 2 | 4 |
| Ethylene-propylene of Example 4 | 2 | 3 |
| Ethylene-propylene of Example 5 | 5 | 7 |
| Ethylene-propylene of Example 6 | | |
| Ethylene-propylene of Example 7 | 4 | 6 |
| Ethylene-propylene of Example 8 | 4 | 6 |
| Ethylene-propylene of Example 9 | 4 | 6 |
| Ethylene-propylene of Example 10 | 5 | 7 |
| Ethylene-propylene of Example 11 | 6 | 8 |

The differences in tension set are evident from the values reported in Table II. It is to be noted that, in general, tension set values higher than 10% as determined by the method used to establish the value $R_2$, are characteristic of elastomers of poor quality.

The examples and data given clearly demonstrate the unexpected advantages which are realized by the present method of effecting the copolymerization and utilizing a liquid reaction medium consisting essentially of the liquid comonomers and in the substantial absence of hydrocarbon solvents which dissolve the catalyst-forming components and also dissolve the amorphous copolymerizates as the latter are formed.

Table III below shows the results obtained using, as one catalyst-forming component, mixtures of the hydrocarbon-soluble vanadium compound $VCl_4$, with varying amounts of $TiCl_4$, while maintaining the molar ratio between the alkyl aluminum compound and the sum of the vanadium and titanium tetrachlorides at 5:1. Similar results are obtained with mixtures of $VOCl_3$ and $TiCl_4$.

The copolymerizates obtained by the runs reported in Table III have compositions similar to those of the copolymerizates reported in Table I, and yield elastomers which have characteristics similar to those reported in Table II for elastomers obtained from amorphous copolymerizates obtained by the present method.

TABLE III

[Polymerization runs with catalysts prepared from Al triisobutyl and mixtures of $TiCl_4$ and $VCl_4$, at $-58°$]

| Run no. | V/Ti molar ratio | Yield | | Polymer obtained | |
|---|---|---|---|---|---|
| | | G./g. catalyst | G./g. $VCl_4$ | Propylene percent in the copolymer mols | Intrinsic viscosity |
| 1 | 9 | 210 | 1.435 | 43 | 6.5 |
| 2 | 5 | 225 | 1.660 | 39 | 8.3 |
| 3 | 3 | 207 | 1.730 | 41 | 7 |
| 4 | 2 | 198 | 1.840 | 39 | 5.7 |
| 5 | 1 | 180 | 2.210 | 38 | 5.8 |
| 6 | 0.5 | 130 | 2.390 | 35 | 9 |

The crude, amorphous, solid, vulcanizable products obtained by the present process are true linear copolymerizates made up of macromolecules each of which contain units of ethylene and units of propylene or of butene-1 in the macromolecular main chain, and are free or practically free of homopolymers of either of the comonomers, which, if present, would remain as residue of the extraction with boiling n-heptane.

The outstanding advantage of the present method is the increased yield of the amorphous copolymerizates obtained based on the amount used of the catalyst prepared from the hydrocarbon-soluble vanadium compounds or mixtures thereof with $TiCl_4$, and the alkyl aluminum compounds which, as reported in our parent application Serial No. 779,249, can be several hundred grams of copolymerizate per gram of catalyst, using catalyst concentrations up to 0.2 g./liter and reactants of even commercial grade, and which is made possible by the use of a liquid reaction medium consisting essentially of the mixture of liquid comonomers which has no dissolving capacity for the amorphous copolymerizates.

Some changes and variations may be made in carrying out the present process without departing from the spirit of the invention. It is intended, therefore, to include in the scope of the appended claims, all such modifications as will be apparent to those skilled in the art from the description and examples given herein.

This application is a continuation-in-part of our application Serial No. 779,249 filed December 9, 1958.

What is claimed is:

1. In the production of linear, amorphous, vulcanizable copolymers, the improvement which comprises producing the copolymers in high yields and directly in the form of discrete, fine particles by dissolving ethylene in a liquid higher alpha-olefin selected from the group consisting of propylene and butene-1, the amount of the higher alpha-olefin in the solution being from 80 to 99.5 mol percent of the total, at a temperature in the range from $+30°$ C. to $-100°$ C., adding to the liquid mixture, at said temperature, (1) an alkyl aluminum compound in which the alkyl radicals contain from 2 to 6 carbon atoms, and
(2) a substance selected from the group consisting of hydrocarbon-soluble vanadium compounds and mixtures of hydrocarbon-soluble vanadium compounds with titanium tetrachloride, at least one of (1) and (2) containing halogen, and (1) and (2) being added in relative amounts to form a catalyst for effectively copolymerizing the monomers; effecting the copolymerization by maintaining the liquid containing the catalyst, which liquid comprises the solution of ethylene in the liquid selected higher alpha-olefin and is essentially free of a solvent for the copolymers formed, at a temperature in the range $+30°$ C. to $-100°$ C., and while maintaining the molar ratio of ethylene to higher alpha-olefin in the reacting liquid phase substantially constant, and recovering the amorphous copolymer in the form of the discrete, fine particles in which it separates from the liquid reacting phase when it is produced under the recited conditions.

2. The improvement according to claim 1, characterized in that the copolymerization is carried out at a temperature of $-10°$ C. to $-100°$ C.

3. The improvement according to claim 1, characterized in that (2) is vanadium tetrachloride.

4. The improvement according to claim 1, characterized in that (2) is vanadium oxytrichloride.

5. The improvement according to claim 1, characterized in that (1) is an alkyl aluminum halide and (2) is vanadium triacetylacetonate.

6. The improvement according to claim 1, characterized in that (1) is an alkyl aluminum halide and (2) is a vanadyl alkoxide.

7. The improvement according to claim 1, characterized in that (1) is an aluminum trialkyl and (2) is vanadium tetrachloride.

8. The improvement according to claim 1, characterized in that (1) is a dialkyl aluminum halide and (2) is vanadium tetrachloride.

9. The improvement according to claim 1, characterized in that (1) is diethyl aluminum monochloride and (2) is vanadium tetrachloride.

10. The improvement according to claim 1, characterized in that (1) is an alkyl aluminum halide and (2) is vanadyl tri-isobutoxide.

11. The improvement according to claim 1, characterized in that (1) is a dialkyl aluminum chloride and (2) is vanadium triacetylacetonate.

12. The improvement according to claim 1, characterized in that (1) is diethyl aluminum monochloride and (2) is vanadium triacetylacetonate.

13. The improvement according to claim 1, characterized in that (1) is diethyl aluminum monochloride and (2) is vanadyl tri-isobutoxide.

14. The improvement according to claim 1, characterized in that the higher alpha-olefin is propylene.

15. The improvement according to claim 1, characterized in that the higher alpha-olefin is butene-1.

16. The improvement according to claim 1, characterized in that the concentration of the catalyst formed from the alkyl aluminum compound and hydrocarbon-soluble vanadium compound is from 0.02 g./liter to 0.2 g./liter of the liquid reaction medium which is a non-solvent for the amorphous copolymers and consists essentially of the solution of ethylene in the selected liquid higher alpha-olefin; reactants of commercial grade are used; and the yield of amorphous copolymer which, as it is produced, separates from the liquid reaction medium in the form of fine particles, is in excess of 100 grams of copolymer per gram of catalyst used.

17. The improvement according to claim 1, characterized in that ethylene is continuously fed into the copolymerization zone at a rate such that the molar ratio of ethylene to propylene is maintained substantially constant throughout the copolymerization reaction.

References Cited

UNITED STATES PATENTS 3,002,961  10/1961  Kirschner _____ 260—94.9

FOREIGN PATENTS 553,655  6/1957  Belgium.
785,314  10/1957  Great Britain.
824,369  11/1959  Great Britain.

OTHER REFERENCES

Natta et al., "La Chimica e l'Industria," vol. 39, September 1957, pages 733–743, page 739 relied on.

Natta et al., "La Chimica e l'Industria," vol. 39, October 1957, pp. 825–831, page 827 relied on.

JOSEPH L. SCHOFER, *Primary Examiner.*

M. B. KURTZMAN, F. L. DENSON,
*Assistant Examiners.*

UNITED STATES PATENT OFFICE
CERTIFICATE OF CORRECTION

Patent No. 3,370,052                      February 20, 1968
             Rino Mostardini et al.

It is certified that error appears in the above identified patent and that said Letters Patent are hereby corrected as shown below:

In the heading to the printed specification, lines 7 and 8, for "Roberto Magri, Salsomaggiore, Parma, Rosario Lanzo, Mantua" read -- Roberto Magri, Trento, Rosario Lanzo, Mantova, --; column 3, line 8, for "butane-1" read -- butene-1 --; column 6, line 1, for "diactyl-" read -- diacetyl- --; column 8, line 16, for "ethylene," read -- ethylene. --.

Signed and sealed this 15th day of July 1969.

(SEAL)
Attest:

Edward M. Fletcher, Jr.                   WILLIAM E. SCHUYLER, JR.
Attesting Officer                            Commissioner of Patents